US011270378B2

(12) United States Patent
Brookfield

(10) Patent No.: US 11,270,378 B2
(45) Date of Patent: *Mar. 8, 2022

(54) METHODS AND APPARATUS TO INTERNALIZE TRADE ORDERS

(71) Applicant: TRADING TECHNOLOGIES INTERNATIONAL INC., Chicago, IL (US)

(72) Inventor: Bevan Jacob Brookfield, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,246

(22) Filed: Jan. 8, 2020

(65) Prior Publication Data

US 2020/0143473 A1    May 7, 2020

Related U.S. Application Data

(63) Continuation of application No. 14/819,019, filed on Aug. 5, 2015, now Pat. No. 10,565,646.

(51) Int. Cl.
*G06Q 40/04* (2012.01)
(52) U.S. Cl.
CPC ................... *G06Q 40/04* (2013.01)
(58) Field of Classification Search
CPC ....................................................... G06Q 40/04
(Continued)

(56) References Cited

U.S. PATENT DOCUMENTS 4,674,044 A    6/1987  Kalmus et al.
4,750,135 A    6/1988  Boilen
(Continued)

FOREIGN PATENT DOCUMENTS

EP    388162 A2    9/1990
EP    1067471 A1    1/2001
(Continued)

OTHER PUBLICATIONS

International Search Report and Written Opinion of International Application No. PCT/US2016/043297, dated Sep. 8, 2016 (dated Oct. 6, 2016).
(Continued)

*Primary Examiner* — Robert R Niquette

(57) ABSTRACT

Methods and apparatus to internalize trade orders are described herein. An example method includes obtaining, via an internalization manager, a trade order communicated to an exchange. The trade order corresponds to a tradeable object offered at the exchange. The example method includes comparing, via the internalization manager, the trade order to one or more trade orders in an internalization order record to determine whether a matching contra-side trade order is included in the one or more trade orders in the internalization order record. The example method includes communicating, via the internalization manager, an order modification to the exchange if a matching contra-side trade order is included in the one or more trade orders in the internalization order record, and matching, via the internalization manager, if a matching contra-side trade order is included in the one or more trade orders in the internalization order record, the trade order to the matching contra-side trade order in the internalization order record.

12 Claims, 10 Drawing Sheets

(58) Field of Classification Search
USPC .................................................. 705/35–45
See application file for complete search history.

(56) References Cited

U.S. PATENT DOCUMENTS

| | | |
|---|---|---|
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,689,651 A | 11/1997 | Lozman |
| 5,727,165 A | 3/1998 | Ordish et al. |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,845,266 A | 12/1998 | Lupien et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,667 A | 8/1999 | Tull, Jr. et al. |
| 5,953,708 A | 9/1999 | Midorikawa et al. |
| 5,963,923 A | 10/1999 | Garber |
| 6,012,046 A | 1/2000 | Lupien et al. |
| 6,014,643 A | 1/2000 | Minton |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,377,940 B2 | 4/2002 | Tilfors et al. |
| 6,405,180 B2 | 6/2002 | Tilfors et al. |
| 6,408,282 B1 | 6/2002 | Buist |
| 6,411,998 B1 | 6/2002 | Bryant et al. |
| 7,792,733 B1 | 9/2010 | Keith |
| 8,433,645 B1 * | 4/2013 | Waelbroeck ........... G06Q 40/00 705/37 |
| 2001/0032163 A1 | 10/2001 | Fertik et al. |
| 2002/0023038 A1 | 2/2002 | Fritsch et al. |
| 2002/0026321 A1 | 2/2002 | Faris et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0103741 A1 | 8/2002 | Boies et al. |
| 2002/0107748 A1 | 8/2002 | Boies et al. |
| 2002/0138401 A1 | 9/2002 | Allen et al. |
| 2002/0161687 A1 | 10/2002 | Serkin et al. |
| 2002/0161693 A1 | 10/2002 | Greenwald |
| 2002/0178102 A1 | 11/2002 | Scheinberg et al. |
| 2003/0074253 A1 | 4/2003 | Scheuring et al. |
| 2003/0177086 A1 | 9/2003 | Gomber et al. |
| 2003/0225672 A1 | 12/2003 | Hughes, Jr. et al. |
| 2010/0094743 A1 | 4/2010 | Robertson et al. |
| 2010/0325061 A1 | 12/2010 | Neff et al. |
| 2010/0325062 A1 * | 12/2010 | O'Shaughnessy ..... G06Q 40/10 705/36 R |
| 2011/0238556 A1 | 9/2011 | Harmaty et al. |
| 2011/0264577 A1 | 10/2011 | Winbom et al. |
| 2011/0320336 A1 | 12/2011 | Olsson et al. |
| 2012/0016785 A1 | 1/2012 | Mintz |
| 2012/0221486 A1 * | 8/2012 | Leidner .............. G06Q 10/0635 705/36 R |
| 2012/0284158 A1 | 11/2012 | Kovac |
| 2016/0140661 A1 | 5/2016 | Rooney |
| 2017/0039642 A1 | 2/2017 | Brookfield |

FOREIGN PATENT DOCUMENTS

| | | |
|---|---|---|
| EP | 1321870 A1 | 6/2003 |
| GB | 2366630 A | 3/2002 |
| WO | 1990/10910 A1 | 9/1990 |
| WO | 1990/11571 A1 | 10/1990 |
| WO | 1991/14231 A1 | 9/1991 |
| WO | 1995/06918 A2 | 3/1995 |
| WO | 1995/06918 A3 | 3/1995 |
| WO | 1995/26005 A1 | 9/1995 |
| WO | 1998/49639 A1 | 11/1998 |
| WO | 1999/19821 A1 | 4/1999 |
| WO | 1999/30259 A1 | 6/1999 |
| WO | 2000/11587 A1 | 3/2000 |
| WO | 2000/48113 A1 | 8/2000 |
| WO | 2000/52619 A1 | 9/2000 |
| WO | 2000/62187 A2 | 10/2000 |
| WO | 2000/62187 A3 | 10/2000 |
| WO | 2000/65510 A1 | 11/2000 |
| WO | 2001/04817 A1 | 1/2001 |
| WO | 2001/16830 A1 | 3/2001 |
| WO | 2001/16852 A2 | 3/2001 |
| WO | 2001/22263 A2 | 3/2001 |
| WO | 2001/22263 A3 | 3/2001 |
| WO | 2001/22315 A2 | 3/2001 |
| WO | 2001/88808 A1 | 11/2001 |
| WO | 2002/07032 A1 | 1/2002 |
| WO | 2002/15461 A2 | 2/2002 |
| WO | 2003/071397 A2 | 8/2003 |
| WO | 2003/071397 A3 | 8/2003 |

OTHER PUBLICATIONS

Kharouf, J. and Cavaletti, C. "A Trading Room with a View," Futures, vol. 27, Nov. 1998, pp. 66-71.
Myerson, Allen, "Computer Data Services Opening Up," Third Edition, The New York Times, Oct. 12, 1993, retrieved from http://search.proquest.com/docview/305478172?accountid=14753.
Unpublished U.S. Appl. No. 10/376,932, filed Feb. 28, 2003 to Kemp II, et al.
USPTO Presentation, NASDAQ, Nov. 8, 2001, 15 pages.
X_Trader Product HTML Page [online], Trading Technologies International, Inc., Jun. 9, 2000. [Retrieved on Mar. 22, 2001] from the Internet: www.tradingtechnologies.com/products/xtrade_full.html.

* cited by examiner

METHODS AND APPARATUS TO INTERNALIZE TRADE ORDERS

CROSS REFERENCE TO RELATED APPLICATIONS

The present application is a continuation of U.S. patent application Ser. No. 14/819,019, filed on Aug. 5, 2015, now U.S. Pat. No. 10,565,646, the contents of which are fully incorporated herein by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Many individual trade orders are created daily, across different groups within a trading firm or financial institution (e.g., a brokerage firm). In some examples, these trade orders may be orders to buy or sell one or more tradeable objects in accordance with a particular trading strategy. The tradeable objects that are desired (e.g., as subject of a buy order) may be currently owned by the same trading firm (e.g., on the books of another trading group in the trading firm). Conversely, the tradeable object that is to be sold (e.g., as subject of a sell order) may be desired by another group and/or trader in the same trading firm. When a buy order and a sell order exist for a tradeable object at the same trading firm or financial institution, the orders are referred to as "crossing."

BRIEF DESCRIPTION OF THE FIGURES

Certain embodiments are disclosed with reference to the following drawings.

Figure 1:
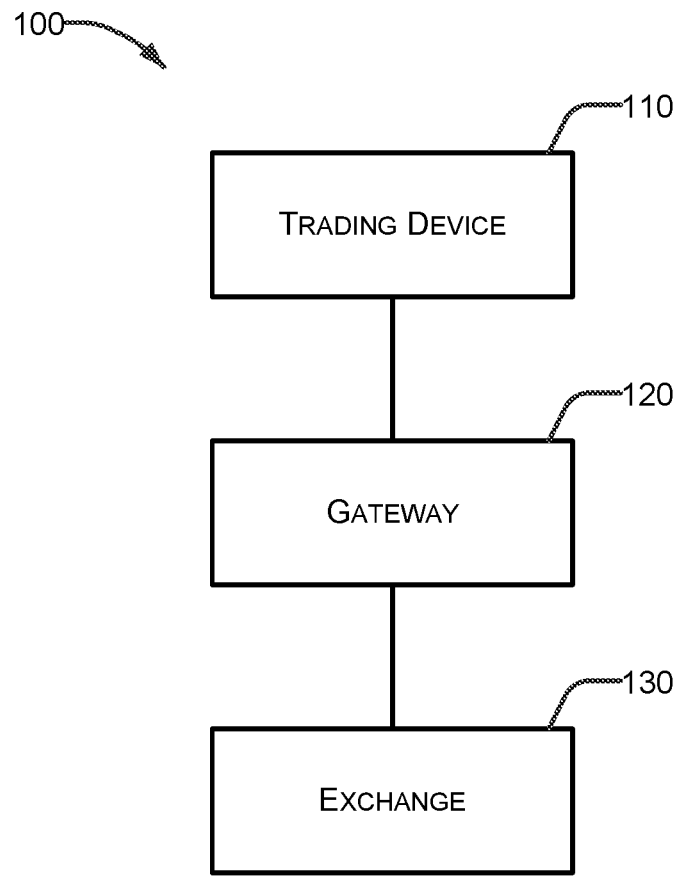
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading systems and, more specifically, to methods and apparatus to internalize trade orders. As used herein, a trade order may include a request to trade (e.g., an exchange between two parties and/or agents for a tradeable object) and/or an offer to buy or sell a tradeable object at a given quantity and price.

Trading devices establish a communication link (e.g., via a wired and/or wireless communication network) with an exchange via a gateway. In some examples, users associated with a trading device may execute a trade for a tradeable object. Trade orders that cross, or match (e.g., buy-sell of the same tradeable object, sell-buy of the same tradeable object, etc.), may originate for similar tradeable objects in a trading institution. In the past, these orders would be filled in the exchange and/or market. However, since these "matching" orders may render each other at least partially moot, using examples disclosed herein, a trade internalization manager may internalize these trades "in house," thereby obviating the need to participate in the exchange when it can be faster, more economical and convenient to perform the trade internally.

In some examples disclosed herein, a multicast system for internalization and/or internal trading is described. That is, a trade order originating from a trading device, a high frequency trading server or an algorithmic trading server is transmitted simultaneously, or substantially simultaneously, to an exchange and an example trade internalization manager. Therefore, the trade order is listed at the exchange and is also analyzed for internalization by the trade internalization manager. When a trade order can be internalized (e.g., a crossing trade and/or group of crossing trades are identified), the trade internalization manager attempts to cancel or modify the corresponding trade order listed at the exchange so that the trade order can be completed internally.

By implementing the multicast system, zero latency internalization can be achieved. In other words, by communicating the trade order simultaneously to the trade internalization manager and the exchange, an internalization process may be implemented without introducing additional communication latency and the incurring no loss of market position. Successful trading strategies often depend on timeliness of placed trade orders to capitalize on market conditions. By eliminating latency in the placing of orders, market conditions may be effectively capitalized on by trading institutions using methods disclosed herein. Methods for internalization using multicast as disclosed herein are advantageous to algorithmic/high frequency traders. Using methods disclosed herein, algorithmic/high frequency trade servers may operate in an efficient manner in tandem with a trade internalization manager. For example, the algorithmic/high frequency trade servers operate according to algorithms and/or market conditions. As such, the algorithmic/high frequency trade servers, in many instances, conduct more trade volume than a human actor. Additionally, by internalizing a trade order at the trading firm or financial institution, exchange fees that are typically incurred by filling the trade order via the exchange can be avoided.

For example, one trader at a trading firm may have an order to sell 100 shares of tradeable object ABC, and another trader at the trading firm may have an order to buy 100 shares of tradeable object ABC. Both of these orders may be communicated via multicast to both the exchange and the disclosed trade internalization manager. The commonality, matching, or "crossing" of the two orders for the same tradeable object can be identified by an example trade internalization manager to fulfill the orders internally (e.g., within the trading firm or financial institution) rather than relying solely on orders sent to an exchange to be matched. In another example, if one trader at a trading firm has an order to sell 100 shares of tradeable object ABC, and another trader at the trading firm has an order to buy 50 shares of tradeable object ABC, then the example trade internationalization manager may fill the buy order of 50 shares and partially fill the sell order with 50 of the 100 shares. The remaining 50 shares of tradeable object ABC continue to be worked at the exchange.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments disclosed herein provide a method including obtaining, via a trade internalization manager, a trade order communicated to an exchange. The trade order corresponds to a tradeable object offered at the exchange. The example method includes comparing, via the trade internalization manager, the trade order to one or more trade orders in an internalization order record to determine whether a matching contra-side trade order is included in the one or more trade orders in the internalization order record. The example method includes communicating, via the trade internalization manager, an order modification to the exchange if a matching contra-side trade order is included in the one or more trade orders in the internalization order record, and matching, via the trade internalization manager, if a matching contra-side trade order is included in the one or more trade orders in the internalization order record, the trade order to the matching contra-side trade order in the internalization order record.

Certain embodiments provide a trading device including a processor configured to obtain a trade order communicated to an exchange. The trade order corresponds to a tradeable object offered at the exchange. The example processor is configured to compare the trade order to one or more orders in an internalization order record to determine whether a matching contra-side trade order is included in the one or more trade orders in the internalization order record. The example processor is also configured to communicate an order modification to the exchange if a matching contra-side trade order is included in the one or more trade orders in the internalization order record, and match, if a matching contra-side trade order is included in the one or more trade orders of the internalization order record, the trade order to the matching contra-side trade order in the internalization order record.

Certain embodiments provide a tangible computer-readable storage medium including instructions that, when executed, cause a processor to at least obtain a trade order communicated to an exchange. The trade order corresponds to a tradeable object offered at the exchange. The example instructions cause the processor to at least compare the trade order to one or more trade orders in an internalization order record to determine whether a matching contra-side trade order is included in the one or more trade orders in the internalization order record. The example instructions cause the processor to at least communicate an order modification to the exchange if a matching contra-side trade order is included in the one or more trade orders in the internalization order record, and match, if a matching contra-side trade order is included in the one or more trade orders in the internalization order record, the trade order to the matching contra-side trade order in the internalization order record.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
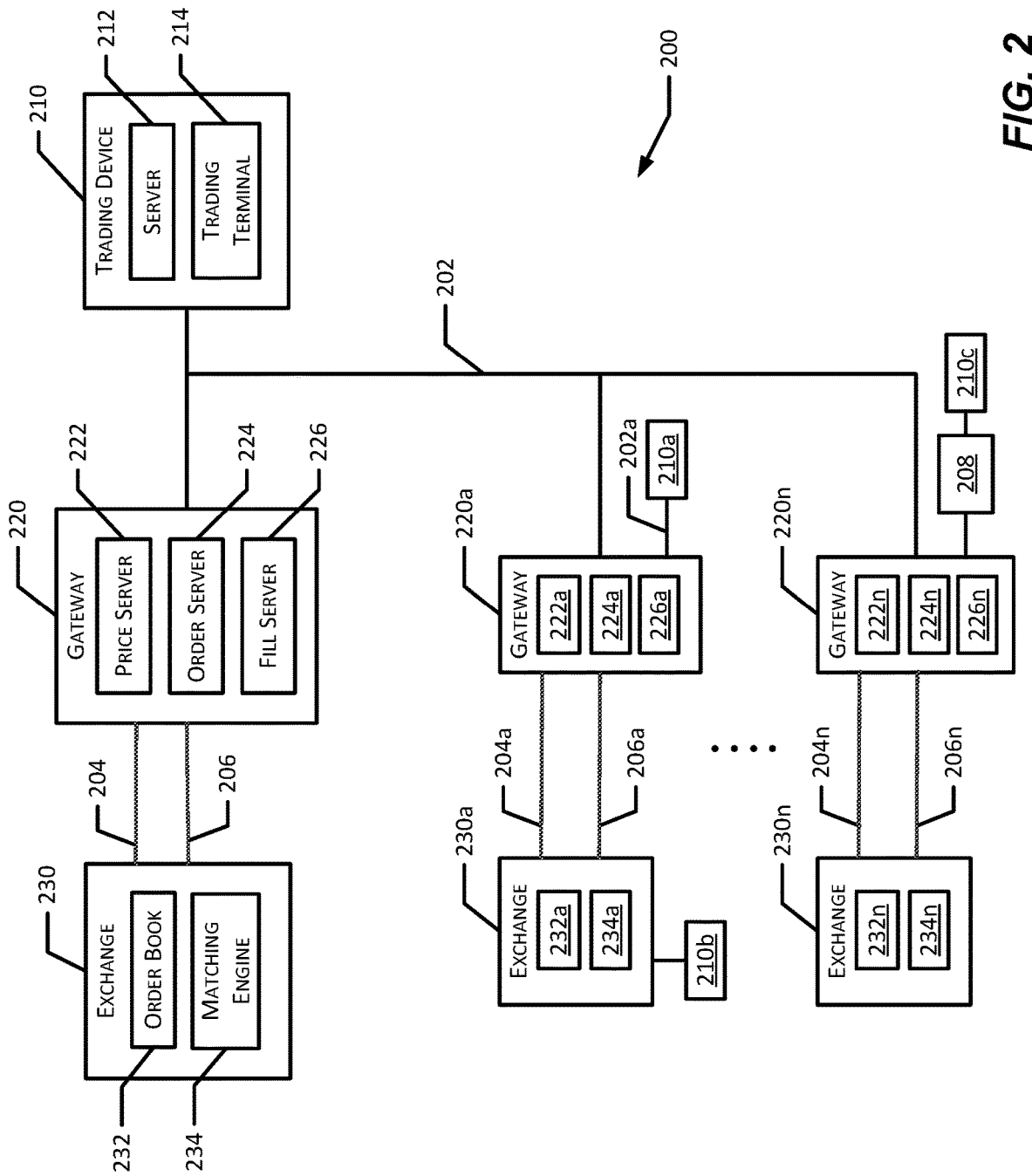
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
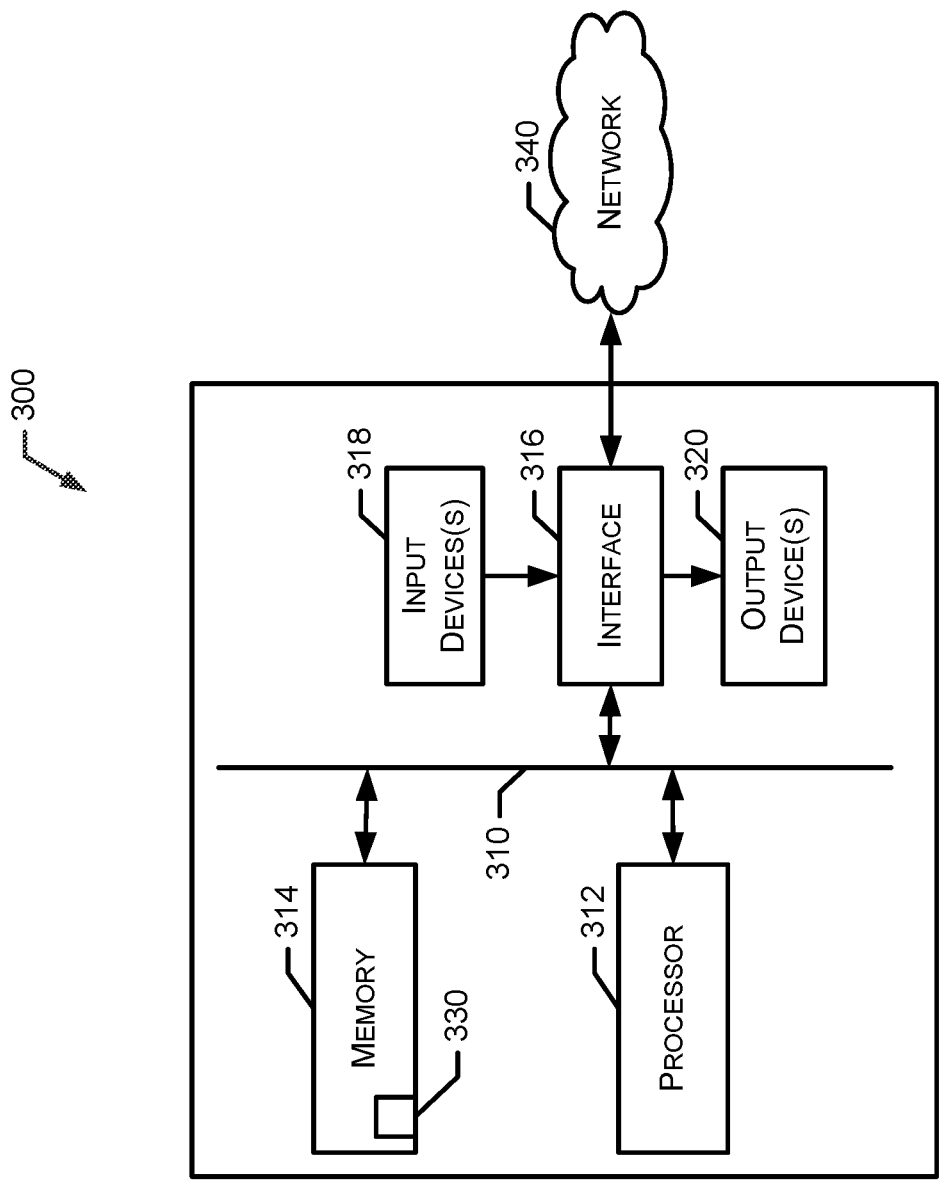
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may include AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
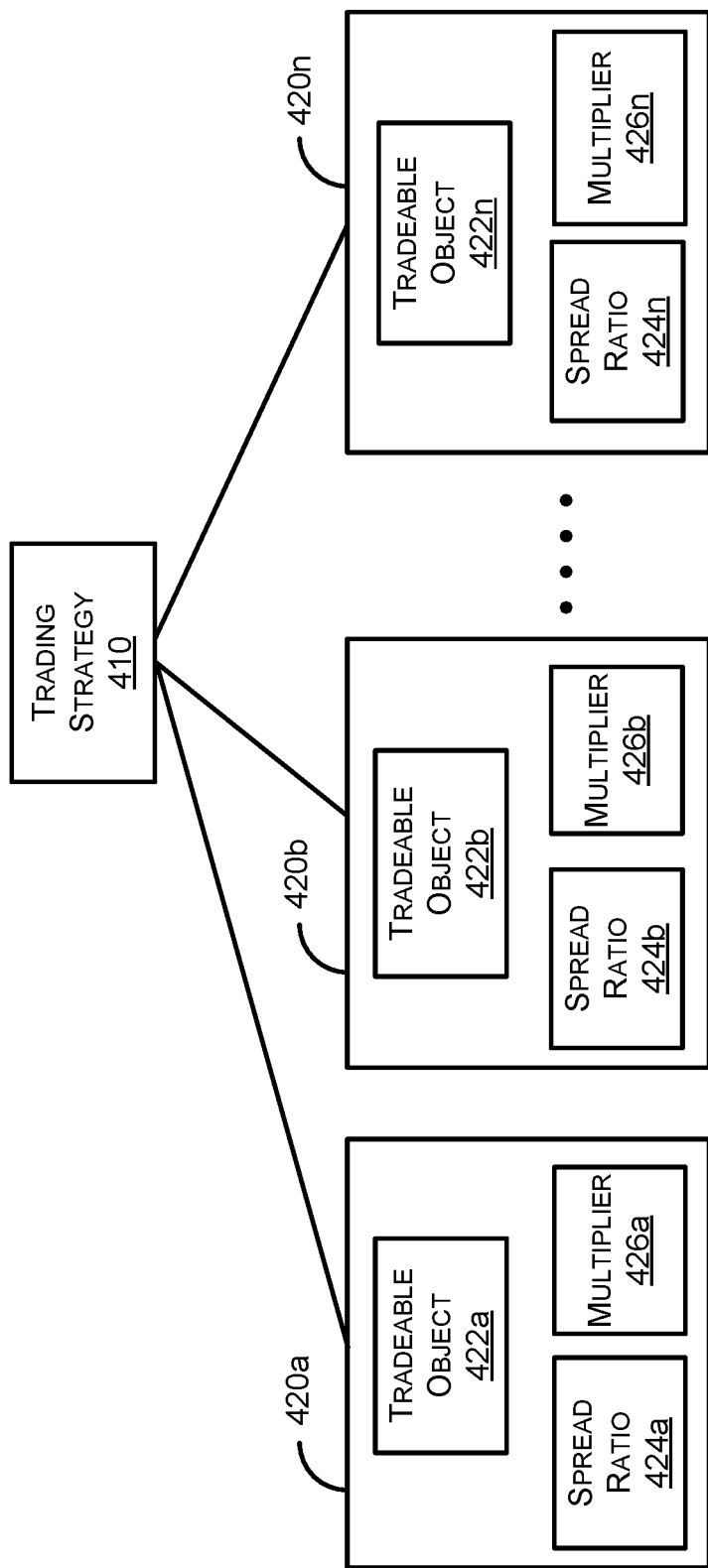
FIG. 4 illustrates a block diagram of a trading strategy, which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420a-420n comprising the tradeable objects 422a-422n multiplied by corresponding multipliers 426a-426n. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+ (−1)(40)=5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, and/or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. Methods and Apparatus to Internalize Trade Orders

As used herein, the terms trade order record, internalization record and internalization book may be used interchangeably to refer to a database that includes data relating to unmatched trade orders that have been submitted to the exchange. For example, an internalization record may include data relating to a market for a tradeable object. Additionally or alternatively, the data contained in the internalization record may include data related to the inside market, market depth at various price levels, the last traded price, and the last traded quantity.

While most trades are executed at an exchange, example methods and systems are disclosed herein to identify and internalize (e.g., within a trading firm or financial institution) at least a portion of the trades executed using an electronic trading system. As used herein, a contra-side order refers to a trade order that is opposite or complementary to another trade order. For example, a buy order for tradeable object ABC for a given quantity at a given price is a contra-side order of a sell order for tradeable object ABC at the same quantity and same price. A buy order and a sell order may be a full contra-side of each other (e.g., same quantity and same price), a partial contra-side (e.g., a partial quantity, not the same quantity, and same price), etc.

In electronic trading systems, a trade order is a request to conduct a transaction for a tradeable object. Trade orders may include data associated with an order type (e.g., buy or sell), a price, a quantity, and/or a time or duration. The example systems and methods disclosed herein may be implemented to analyze and determine whether a contra-side order exists for a given tradeable object. In some examples, when a contra-side order exists, an example trade internalization manager presents an option to complete the trade internally (e.g., within the trading firm or financial institution). Therefore, using example methods and apparatus disclosed herein, trades can be completed "in-house" without having to utilize resources of an exchange for the tradeable object.

The example trade internalization manager disclosed herein detects potentially crossing or matching trade orders for the same tradeable object and selectively executes the trade internally (e.g., at the originating trading firm or financial institution), rather than externally via an exchange. Completing a trade internally may be preferable to fulfilling a trade order at the exchange at least in part because unnecessary fees may be avoided. For example, fees are incurred for listing and/or filling buy and/or sell orders for a tradeable object at an exchange. On the other hand, when buy and sell orders for the same tradeable object are exchanged internally, sending and completing trade orders at the exchange can be avoided. For example, if trade orders can be identified and matched internally, trading firms or financial institutions reduce the volume of trade orders resting at the exchange, thereby reducing the impact on exchanges and the fees incurred as a result of the trading activity. Timing and responsiveness can also be improved by avoiding unnecessary communication with the exchange.

In some examples, a trade order to be sent to an exchange is communicated to a trade internalization manager at the same time the trade order is sent to the exchange (e.g., via multicast middleware). The trade internalization manager processes the trade order, for example, to determine a tradeable object and an associated order type, price and quantity for the trade order as well as to determine whether a contra-side trade order exists for the tradeable object. Additionally, the trade internalization manager stores data about the tradeable object in an internalization record for future trade internalization opportunities until the trade order has been filled either (1) at the exchange or (2) internally. A contra-side trade order may be detected by referencing the internalization record of the trade internalization manager to compare elements of a trade order under review with a trade order stored in the record, for example. Detection of a match may be made by comparing, for example, the price of the trade order under review to the prices of the stored trade orders. In certain embodiments, determination of a potential match may be based on: the quantity of the trade order being reviewed, the trade order position in queue, the time at which the trader orders were received, and/or other user defined parameters such as a tick variation range. In certain embodiments, the internalization record may identify and organize block trades in order to potentially match against other block trades for large quantities in excess of what is currently available in the market. The internalization record holds information for all trade orders that are still working (e.g., open, active, unfilled, etc.), at the exchange and/or internally at the trading institution. By referencing this internalization record, open trade orders are reviewable to determine candidates for internal, rather than external, trade fulfillment.

If a contra-side or matching trade order is detected for a given tradeable object by the trade internalization manager, the trade internalization manager determines that an opportunity for internalization exists and completes the trade internally. In some examples, the trade internalization manager presents an option for confirmation or approval (e.g., by a trader, administrator, supervisor, risk manager, etc.) to complete the trade internally. In some examples, the trade internalization manager executes an internalized trade for only a portion of a quantity in a trade order (e.g., an internal trade to buy 50 of the 100 shares offered by a contra-side order, etc.). If a contra-side trade order is detected, the trade internalization manager may send a communication or command to the exchange to cancel or modify the trade order that is listed at the exchange. In some examples, the trade internalization manager waits for a response or reply from the exchange that the cancellation or modification was successful and then completes the trade internally. If the response or reply from the exchange indicates the cancellation or modification was unsuccessful, the trade internalization manager may not complete the trade internally, because the trade order was filled at the exchange. If a contra-side trade is not detected by the trade internalization manager, the trade order continues to work at the electronic exchange for normal trading.

Figure 5A:
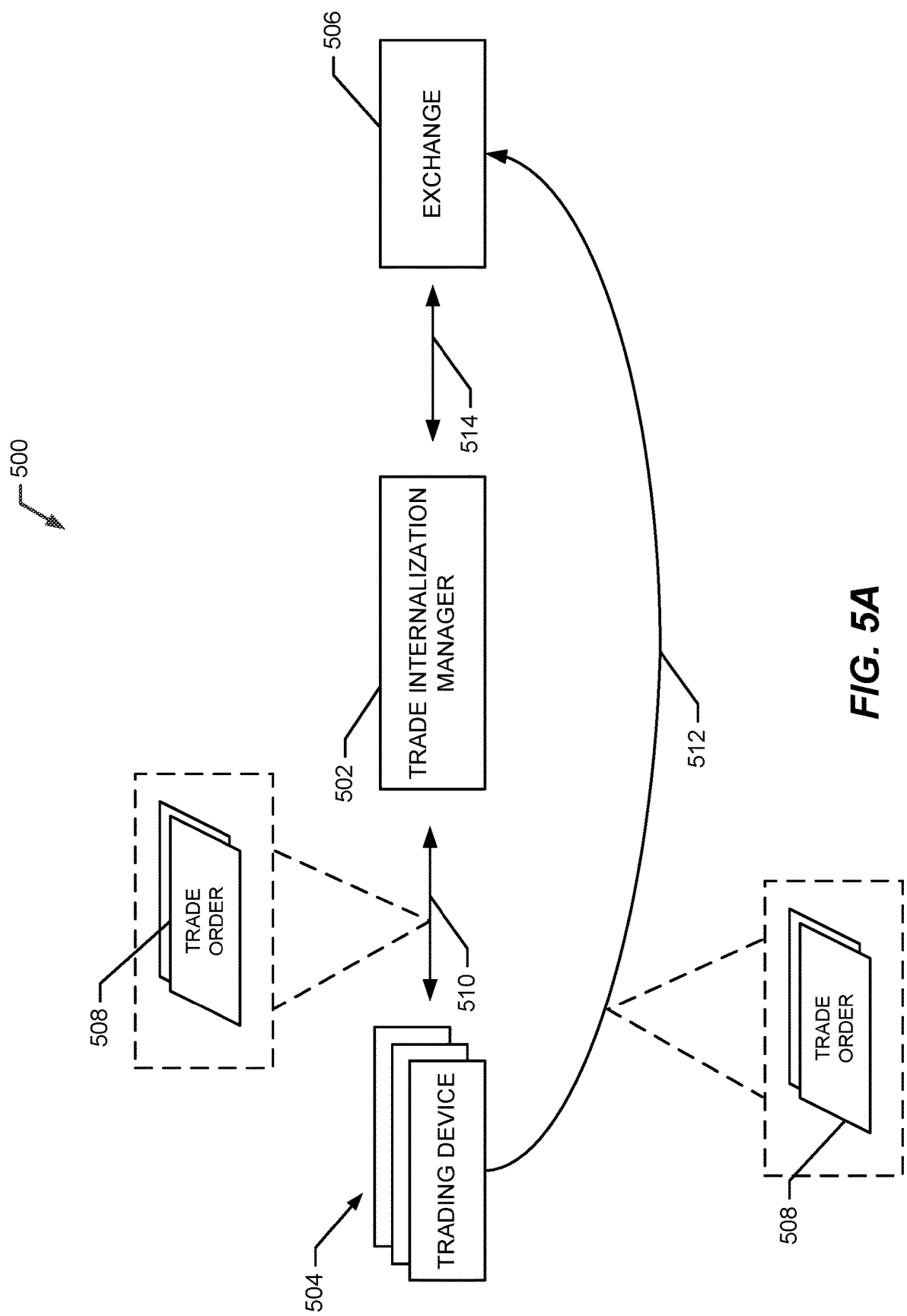
FIG. 5A illustrates a block diagram of an example trading system including a trade internalization manager.

FIG. 5A is a block diagram of a simplified trading system 500 including a trade internalization manager 502, a trading device 504, and an exchange 506. In some examples, multiple trading devices 504 may be implemented. The trading device 504 generates a trade order 508 that is multicast (e.g., communicated or transmitted to multiple locations) to and/or is obtainable by the trade internalization manager 502 and the exchange 506. The trade order 508 is transmitted via multicast to multiple recipients. For example, the trade order 508 is transmitted from the trading device(s) 504 to the trade internalization manager 502 via a first communication path 510. Simultaneously, or substantially simultaneously, to the trade order 508 transmission via the first communication path 510, the trade order 508 is transmitted to the exchange 506 (e.g., to be listed at the exchange 506) via a second communication path 512.

When the trade order 508 is received at the trade internalization manager 502, the trade order 508 is analyzed by the trade internalization manager 502 for potential internalization. In some examples, the trading devices 504 may designate that a particular trade order is not available for internalization (i.e., the trade order 508 is identified as an order that is not to be analyzed by the trade internalization manager 502). In such an example, the trade order 508 is removed from the trade internalization manager 502 and not recorded in the internalization record.

When a potential contra-side or matching order is detected for a trade order 508 at the trade internalization manager 502, the trade internalization manager 502 updates and/or modifies the status of the trade order 508 at the exchange 506. For example, if the trade order 508 at the exchange 506 is listed and unfilled (i.e., the order is resting at the exchange), the trade internalization manager 502 issues a cancellation (or, in some instances, a reduction in quantity) of the trade order 508 at the exchange 506. The cancellation and/or modification of the trade order 508 resting at the exchange allows the crossing or matching orders (e.g., the trade order 508 and the contra-side order at the trade internalization manager 502) to be handled by the trade internalization manager 502 instead of the exchange 506. In the illustrated example, the trade internalization manager 502 is communicatively coupled to the exchange 506 via a third communication path 514. When the trade order 508 has been released (e.g., cancelled, modified) from the exchange, the trade order 508 and the contra-side order detected within the trade internalization manager 502 are exchanged internally (e.g., within a trading firm or financial institution) to complete the internal trading process. In this way, the trade order 508 at the internalization manager 502 can be matched with the contra-side order without risking a double fill at the exchange 506. Execution reports are automatically communicated (e.g., via multicast middleware) to the trade internalization manger 502. The execution reports may include information regarding the trade orders 508 resting at the exchange 506 (e.g., indicating whether a trade order is filled, pending, etc.)

In some instances, the exchange 506 may reject the trade cancellation. For example, the trade order 508 residing at the exchange 506 may be filled or in the process of being filled or it may be in a pre-open period where cancellation is not allowed. In such an instance, the trade internalization manager 502 may reevaluate the status of the trade order 508 at the exchange 506. For example, if the trade internalization manager 502 receives a fill confirmation from the exchange 506 indicating a complete fill of the trade order 508 residing at the exchange 506, the internalization manager 502 will re-examine the trade order 508 residing in the internalization book. If the trade order 508 can still be internalized with other stored trade orders, that will be attempted, if not the trade order 508 will be sent on to the exchange 506. If the trade internalization manager 502 receives a partial fill confirmation from the exchange 506 indicating a partial fill of the trade order 508 residing at the exchange 506, the internalization manager 502 will re-examine trade order 508 and may attempt to (1) cancel the remaining quantity associated with the trade order 508 residing at the exchange 506 and complete the transaction between the trade order 508 residing in the internalization book and the determined contra-side order, and (2) cancel or reduce the remaining quantity associated with any other trade orders 508 residing at the exchange 506 that match, up to the quantity of the trade order 508.

In some examples, a quantity of the trade order 508 and the detected contra-side order may not match. For example, one of the trade orders 508 may be a buy order for 1000 units of tradeable object ABC and the contra-side order (listed in the internalization record and existing at the exchange 506) may be a sell order for 500 units of tradeable object ABC. In such an example, the trade internalization manager 502 may issue a reduce command to reduce the amount of the buy trade order 508 at the exchange by 500 units. When the 500 units are released (e.g., cancelled or modified) from the exchange 506, the trade internalization manager 502 matches the 500 units of the buy trade order 508 with the 500 units from the sell order internally. The execution of the internal trade is broadcast to the trading device(s) 502 500 to inform the trading devices 502 of the internalization.

Figure 5B:
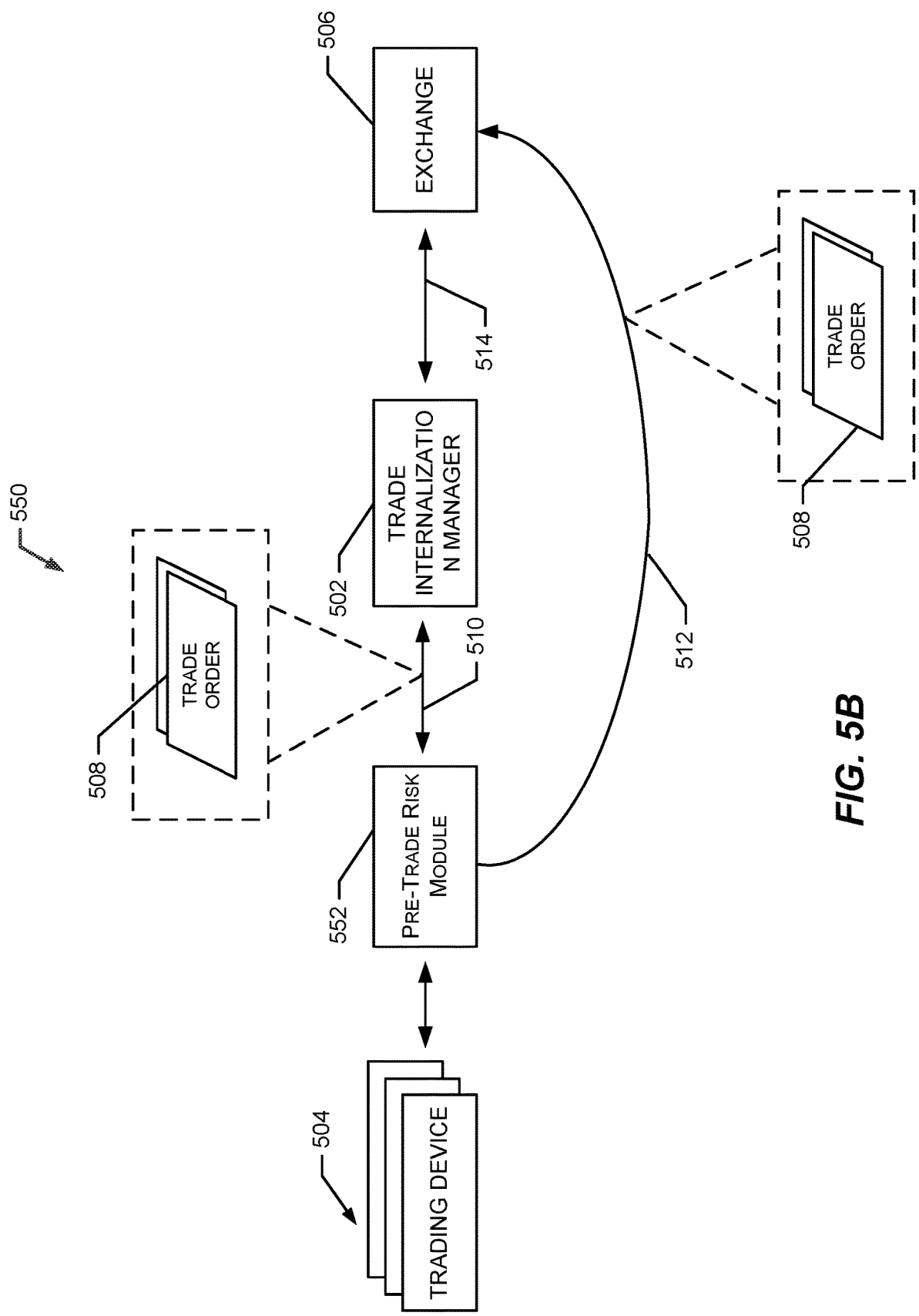
FIG. 5B illustrates a block diagram of an expanded example trading system including a trade internalization manager and a pre-trade risk module.

FIG. 5B is a block diagram of a trading system 550 including a trade internalization manager 502, a trading device 504, an exchange 506 and a pre-trade risk module 552. In some examples, multiple trading devices 504 may be implemented. The trading device 504 generates a trade order 508 that is multicast (e.g., communicated or transmitted to multiple locations) to and/or is obtainable by the trade internalization manager 502 and the exchange 506. For example, the trading device 504 may communicate the trade order 508 to the pre-trade risk module 552 to verify that the trade may proceed and is not in violation of risk limits established with respect to, for example, the individual trader, a group of traders, and/or the firm. The risk module 552, in turn, maintains an aggregate record as part of the previous discussed internalization record. The aggregate record portion of the internalization record includes the working order quantities and average prices of all orders communicated to, and still working at, the exchange 506. As previously discussed, the internalization record is periodically updated to reflect the status of, for example, the trade orders 508 resting at the exchange 506. As subsequent trader orders are received at the risk module 552, the new trade orders are compared to the aggregate record portion of the internalization record maintained at the pre-trade risk module 552. For example, upon receipt of the new trade order, the pre-trade risk module 552 compares the price and quantity of the new trade order to orders stored as part of the internalization record. If a match or a potential match is not identified between the new trade order and the orders stored in the aggregate record portion of the internalization record; then the new trade order is recorded in the internalization record and, assuming risk clearance, a new trader order is multicast to both the exchange 506 and the internalization manager 502. However, if a match or a potential match is identified between the new trade order and one or more of the orders stored as part of the internalization record; then the new trade order is communicated directly to the internalization manager 502 only. In response to the potential match, the internalization manager 502 may attempt to cancel and/or modify existing trade order(s) working at the exchange. Upon receipt and/or notification that the trade order has been canceled or modified, the internalization manager 502 may complete the match and the internalization record may be updated at the pre-trade risk module 552. The trading system 550 introduces no additional latency into the order process by utilizing the pre-trade risk module 552 to maintain and update a copy of the internalization record. Moreover, the trading system 550 can prevent undesirable trading activity such as preventing a trader from trading with themselves and/or other individuals within their own organization.

In addition to storing the internalization record, the pre-trade risk module 552 may be configured to analyze received trade orders against other trading positions currently held by the trader, group of traders and/or the trading firm to determine if the trade order represents a high risk position. For example, the trade order may be for an amount of a tradeable object that would increase the position of the trading firm on the tradeable object beyond a risk threshold. Those trade orders that are deemed to exceed the risk threshold may be rejected and the trading device 504 generating the high risk trade order may be notified that the trade order was cancelled.

Figure 6:
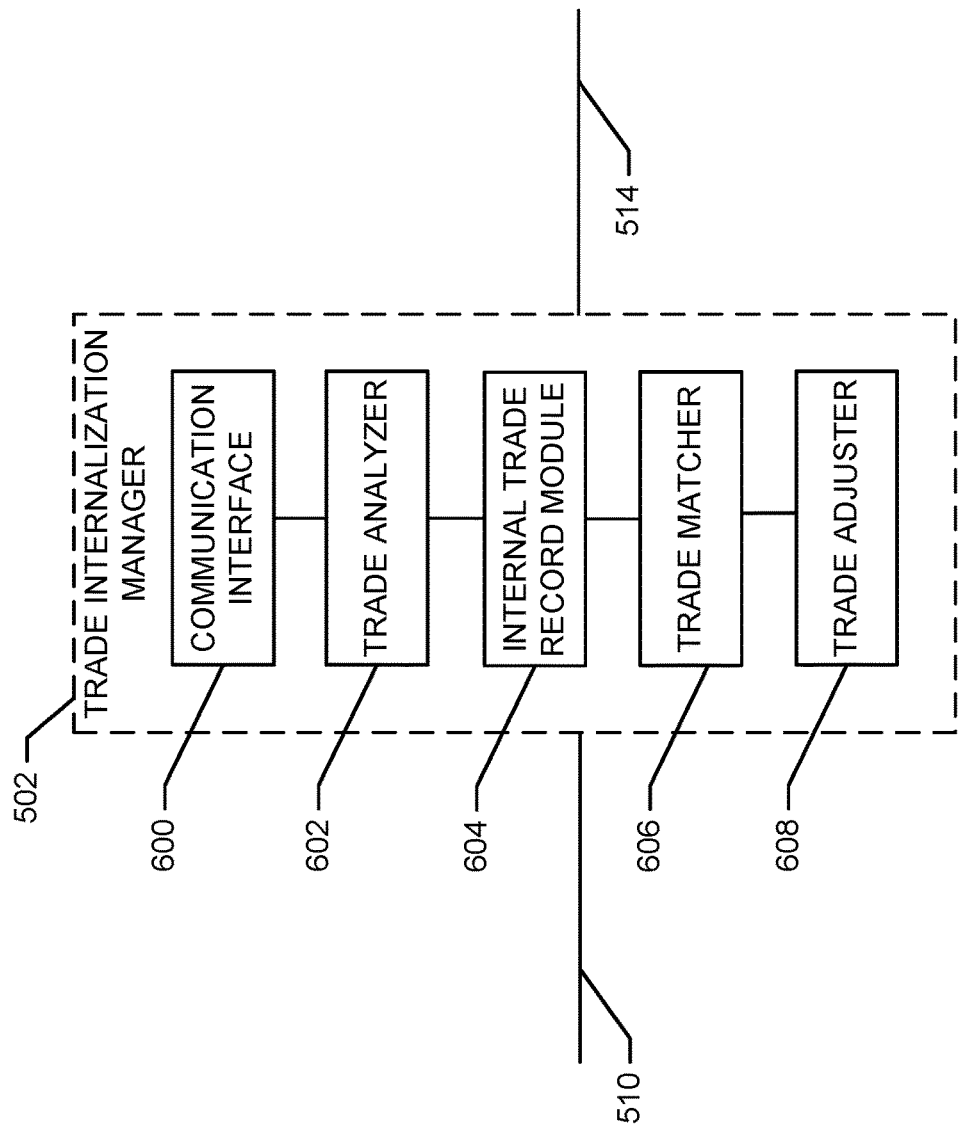
FIG. 6 illustrates a block diagram of the example trade internalization manager of FIGS. 5A and 5B.

FIG. 6 is a block diagram the example trade internalization manager 502. The example trade internalization manager 502 includes a communication interface 600, a trade analyzer 602, an internal trade record module 604, a trade matcher 606, and a trade adjuster 608. The communication interface 600 sends and receives information to/from the trading device(s) 504 via the first communication path 510 and sends and receives information to/from the exchange 506 via the third communication path 514. For example, the communication interface 600 may receive a trade order (e.g., the trade order 508 of FIG. 5) generated by the trading device 504 via the first communication path 510. The communication interface 600 may transmit a command to the exchange 506 via the second communication path 514. In some examples, the communication interface 600 is also in communication with a gateway (e.g., gateway 220 of FIG. 2). The communication interface 600 receives updates from the exchange 506 (e.g., via the gateway) and/or the trading device(s) 504 and sends the updates to the trade analyzer 602. The example trade analyzer 602 updates the example internal trade record module 604 to indicate a current state of the trade order(s) 508 (e.g., from exchanges and/or internal servers) stored in the internal trade record module 604. For example, when a trade order is filled at the exchange 506, the exchange 506 sends a confirmation, and the trade analyzer 602 updates the internal trade record module 604 to reflect that the trade order is closed and should be removed from the internal trade record (e.g., an internalization record).

The example internal trade record module 604 identifies one or more attributes associated with a trade order such as the tradeable object, a price, a quantity, a time of submission, etc. The internal trade record module 604 stores this information for each trade order in an internal trade record. The internal trade record may be a data structure, database, markup/text file, and/or any other suitable data storage format. For example, the internal trade record module 604 stores each open trade order and associated attributes such that options for internalization are searchable when a new trade order is detected at the trade internalization module 502.

The example trade matcher 606 identifies and completes the trade orders selected for internalization. The trade matcher 606 queries the internal trade record module 604 to identify potential matches for a trade order. For example, a buy order for 500 units of tradeable object ABC is analyzed for internal trading by the trade matcher 606. The trade matcher 606 queries the internal trade record of the internal trade record module 604 for contra-side orders (e.g., sell orders) of the tradeable object ABC. The query of the trade matcher 606 returns one or more open sell orders for the tradeable object ABC and the trade matcher 606 selects one of the plurality of open matching orders for internalization. In some examples, the trade matcher 606 may present a list of matching contra-side orders for selection by a user of the trade internalization manager 502 (e.g., via the trading device 504). In some examples, the trade matcher 606 is configured to select one of the plurality of matching contra-side orders for internal fulfillment.

In some examples, prior to completing the trade internally, the trade internalization manager 502 cancels or modifies the trade order 508 at the exchange 506. For example, the trade adjuster 608 may communicate a command to the exchange 506 to cancel or modify the trade order 508 at the exchange 506. The exchange 506 may send a response or reply message indicating whether the cancellation or modification was successful. If the response indicates the cancellation or modification was successful, the trade matcher 606 completes the transaction by transferring the units in the selling trade order (e.g., from a position list, trade record and/or trade book associated with the selling trader) to the position list (e.g., trade record or trade book) of the trader associated with the buy order. If the response or reply message indicates the cancellation or modification was unsuccessful (e.g., because the trade order 508 at the exchange 506 has been filled), the trade matcher 606 does not complete the transaction. In some examples, where the quantity of the trade order and the identified contra-side order are not equal, the trade matcher 606 informs the trade adjuster 608.

The trade adjuster 608 transmits a modification command to the exchange 506 to reduce the quantity of the trade order 508 at the exchange 506 so that the remaining quantity can be internalized.

In some examples, the trade internalization manager 502 attempts to cancel or modify the contra-side order that is listed at the exchange 506, similar to the trade order 508. Therefore, in some examples, both the trade order 508 and the identified contra-side order are canceled and/or modified at the exchange 506 prior to completing the internalization. For example, when the trade adjuster 608 receives feedback (e.g., success, failure, etc.) from the exchange 506, the trade adjuster 608 informs the trade matcher 606 so that (1) the internalization may be completed if the command was successful or (2) the trade matcher 606 may select a new potential matching order if the command was unsuccessful (e.g., if the command to cancel or modify the contra-side trade order at the exchange).

Figure 7:
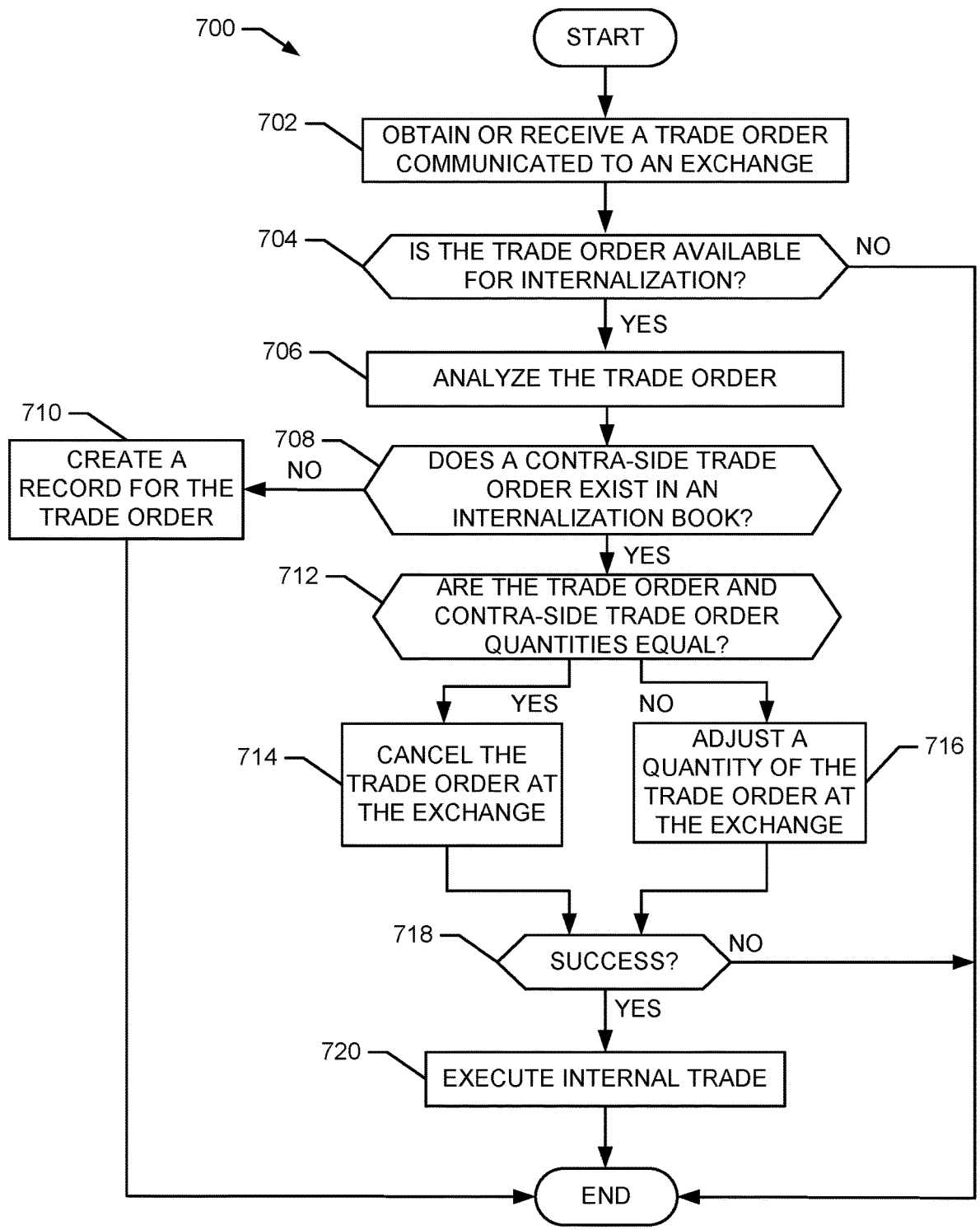
FIG. 7 illustrates a flowchart representative of an example method for internalizing a trade and which may be implemented by the example trade internalization manager of FIGS. 5A and 5B, and FIG. 6.

FIG. 7 is a flowchart representative of an example method or process 700 for internalizing trade orders that may be implemented by the example internationalization manager 502 of FIGS. 5A, 5B and 6. The method 700 may be implemented as machine readable instructions, for example. The example method 700 includes obtaining or receiving a trade order that is communicated to an exchange (block 702). For example, as illustrated in FIG. 6, the communication interface 600 of the internalization manager 502 may obtain or receive the trade order 508 that is communicated to the exchange 506. In some examples, the communication interface 600 detects a trade order being communicated to the exchange 506.

The example method 700 includes determining whether the trade order is available for internalization (block 704).

For example, the communication interface 600 may determine if the trade order is available for internalization. For example, the communication interface 600 analyzes data associated with the trade order determine if the trade order is designated as a candidate for internalization (e.g., via a flag, a metadata indicator, and/or data included in a header of the trade order). In some examples, a trader can select whether the trade order should be available for internal trading or not. If the trade order is not available for internalization, the example method 700 ends. However, if the trade order is available for internalization, the trade order is transmitted to the internal trade record module 604.

The example method 700 includes analyzing the trade order to identify parameters associated with the trade order (block 706). For example, the trade analyzer 602 of FIG. 2 analyzes a trade order for parameters such as the tradeable object associated with the trade order, a quantity, a price, a timestamp, etc. For example, data associated with a trade order for tradeable object ABC (e.g., a buy order for 100 units of ABC placed at 3:17 PM EST) may be detected and extracted and/or copied by the trade analyzer 602 and transmitted to the internal trade record module 604 for storage in an internalization record. The internal trade record module 604 stores the parameters and the trade order identification in the internalization record (e.g., for future internalization efforts in the event a match does not currently exist for the trade order).

The example method 700 of FIG. 7 includes determining whether a contra-side trade order exists in an internalization record or book (block 708). For example, the trade matcher 606 of FIG. 6 determines (e.g., using the internalization record and/or the internal trade record module 604) whether a contra-side order exists in the internalization record of the internal trade record module 604. For example, if the trade order is a buy order for tradeable object ABC, the trade matcher 606 determines if a sell order for the tradeable object ABC exists in the internalization record. If a match does not exist, the example method 700 includes creating a record for the trade order (block 710), and then the example method 700 ends. For example, the trade order may be stored in the internalization record of the internal trade record module 604 (e.g., until such a time that the trade order may be used to match and internalize with a future trade order).

In some examples, determining if a contra-side trade order exists in the internalization record may be configured to utilize various parameters. For example, the trade matcher 606 may be configured to only match human origin trades with each other. In other words, human originated trade orders may not be internalized with algorithm/high frequency server trade orders. For example, algorithm/high frequency server trade orders may only be matched with each other. In certain embodiments, algorithm/high frequency orders may not be matched at all and always bypass the entire trade internalization system.

If the trade order and contra-side trade order quantities are not equal (e.g., the trade order is for a higher quantity than the contra-side trade order), the example method 700 includes adjusting a quantity of the trade order at the exchange (block 716). For example, if the trade matcher 606 determines that the quantity of the trade order and the quantity of the contra-side order are unequal, the trade matcher 606 leverages the trade adjuster 608 to adjust the quantity of the trade order at the exchange 506. For example, the trade adjuster 608 may send a communication or command to the exchange 506 to adjust or modify the quantity of the trade order 508 at the exchange (e.g., based on the difference between the trade order quantity and the contra-side trade order quantity).

The example method 700 includes determining whether the cancellation or adjustment of the trade order at the exchange was a success (block 718). In some examples, a reply is sent back from the exchange indicating whether the command to cancel and/or modify the trade order was successful. For example, the trade internalization manager 502 of FIG. 5 may determine whether the trade order 508 at the exchange 506 was successfully cancelled or modified based on a communication sent from the exchange 506 via the third communication path 514. If the cancellation and/or adjustment of the trade order at the exchange was unsuccessful (e.g., because the trade order at the exchange was filled), the example method 700 ends. If the cancellation and/or adjustment was successful, the example method 700 includes executing the trade between the trade order and the contra-side trade order internally (block 720). For example, the trade matcher 606 may perform the trade internally. In some examples, the trade matcher 606 reports to a server keeping record of trading activity that an internal trade has been completed. In some examples, the example method 700 includes cancelling or modifying the contra-side order at the exchange and determining whether the cancellation or modification was successful prior (e.g., similar to blocks 712-718) prior to completing the internal trade. In some examples, if the contra-side order could not be cancelled or modified at the exchange, the method 700 may include determining if another contra-side order exists in the internalization book (block 708). In some examples, the method 700 may include indicating whether the internal trade was a success. For example, the trade matcher 606 may use the communication interface 600 to transmit an indication of internalization (e.g., the trade order and/or contra-side order) via multicast. For example, the indication of internalization may be broadcast via a network connection to particular trading groups in the trading institution. In other examples, the indication of internalization may be multicast to a plurality of subscribers such as, for example, those associated with the internalization record.

Figure 8:
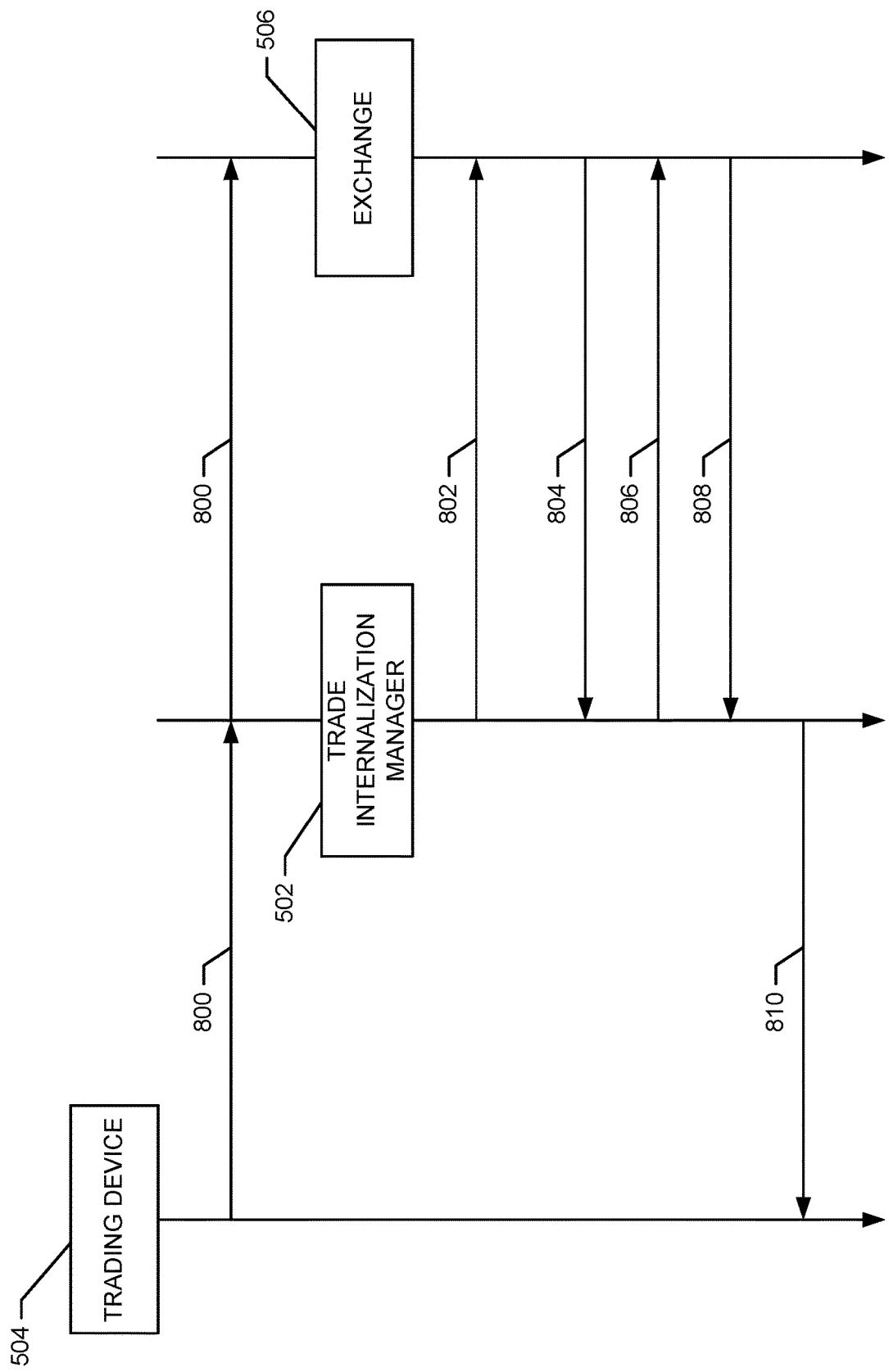
FIG. 8 illustrates an example communication flowchart representing example communications that may be sent and/or received while implementing the example method of FIG. 7 and/or may be implemented by the example trading system of FIGS. 5A and 5B.

FIG. 8 is a data flow diagram of an example internalization of trade orders that may be implemented by the example system 500 of FIG. 5. In the illustrated example, the trading device 504 multicasts a trade order communication 800 to both the trade internalization manager 502 and to the exchange 506 (e.g., via a gateway and/or the pre-trade risk module 552 of FIG. 5B). For example, the trade order communication may represent a buy order for 100 units of tradeable object ABC. The trade internalization manager 502 analyzes the trade order and determines whether a match (e.g., a contra-side order) for the trade order exists in the internalization record. For example, the trade internalization manager 502 may determine that a sell order for 100 units of the tradeable object ABC exists in the internalization record. The sell order for the 100 units of the tradeable object ABC may have been previously transmitted to the exchange and may be listed at the exchange.

In some examples, the internalization manager 502 communicates an update request with respect to the trade order (802). For example, the internalization manager 502 inquires as to the status of the buy order of the 100 units of ABC (e.g., is the trade order filled or unfilled). Additionally or alternatively, trade internalization manager 502 may receive execution reports (e.g., that are multicast) from the exchange 506, automatically (e.g., periodically), which indicate the current status of trade orders at the exchange 506.

In the illustrated example, the exchange 506 responds to the trade internalization manager 502 with the status of the trade order (804). For example, the exchange 506 responds to the trade internalization manager 502 that the by order for the 100 units of ABC is listed on the exchange 506 and is currently unfilled. In response to determining that the trade order is unfilled at the exchange 506, the trade internalization manager 502 communicates a request to cancel or modify the trade order from listing on the exchange (806). For example, the trade internalization manager 502 communicates a request to remove the buy order for 100 units of ABC from the exchange 506 that the buy order may be matched and internalized with the contra-side sell order in the internalization record.

In the illustrated example, the exchange 506 responds with an indication of success (808). For example, the response (808) from the exchange 506 may indicate that the buy order of 100 units of ABC was successfully removed from listing at the exchange 506.

In some examples, the response (808) from the exchange may indicate a failure to execute the previously communicated instructions (806). For example, the buy order of 100 units of ABC may have been filled in the time between communications 800 and 806. In such an example, the buy order may not be removed because the trading activity and/or transaction was completed at the exchange 506. In some examples, the trade internalization manager 502 also sends an update request with regards to the contra-side order that is at the exchange 506 and attempts to cancel or modify the contra-side order that is at the exchange (similar to the trade order). In some examples, if the contra-side order at the exchange 506 cannot be cancelled or modified, the trade internalization manager 502 may search for another potential contra-side order in the internalization records. If the cancellation or modification was successful, the trade internalization manager 502 completes the internalization or internal trade and informs the respective trading device 504 that internalization has been performed and completed (810). For example, the trade internalization manager 502 exchanges the 100 units of ABC from the seller's record to the buyer's record and informs the trading device 504 that an internal trade has been conducted.

Figure 9:
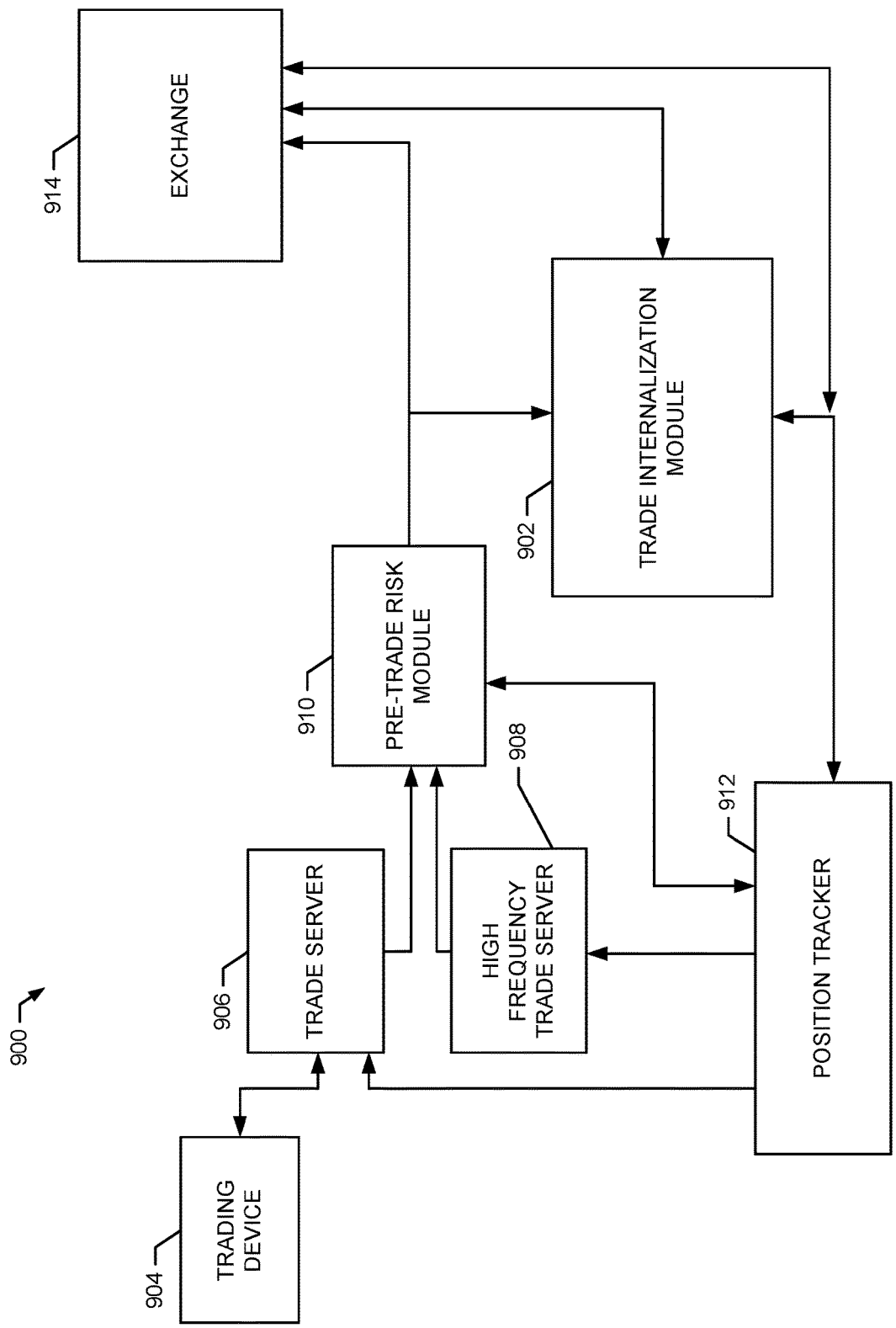
FIG. 9 is a block diagram of an example trading system including a trade internalization manager that may be implemented by the example trade internalization manager of FIG. 6.

In some examples, a trade internalization manager (e.g., the trade internationalization manager 502) may be incorporated into a multicast trading system working with an exchange. FIG. 9 is a block diagram of an example trading system 900 including a trade internalization manager 902 (e.g., that corresponds to the trade internalization manager shown in FIGS. 5A, 5B and 6). The example system 900 includes blocks representative of entities employed by an example trading institution that include an example trading device 904, an example trade server 906, an example high frequency trade server 908, an example pre-trade risk module 910, and an example position tracker 912. The example trading system also includes an example exchange 914 operated by a regulated entity.

In the illustrated example, a trade order (e.g., a normal trade order) originates from a trading device 904. For example, the trade order may be executed by a human trader. The trade order that originates from the trading device 904 is transmitted to the example trade server 906. The example trade server 906 routes and/or handles trade orders originating from example trading devices such as trading device 904. Additionally or alternatively, a high frequency trade server 908 generates one or more trade orders (e.g., synthetic trade orders or trade orders based on a synthetic market) according to the high frequency trade server's 908 configuration and/or programming. Both types of trade orders (normal and synthetic) are respectively transmitted from either the trade server 906 or the high frequency trade server 908 to the pre-trade risk module 910.

In the illustrated example, the pre-trade risk module 910 verifies that the trade order does not place the trading institution in a precarious market condition. For example, parameters associated with the trade order (e.g., price per unit, quantity, etc.) are analyzed against pre-determined thresholds as set by the respective trading institution. When the trade orders are verified, the pre-trade risk module 906 multicasts (e.g., simultaneously, or substantially simultaneously) the trade orders to the exchange 914 for listing and to the trade internalization module 902 constructed in accordance with methods disclosed herein. The trade internalization module 902 reports the status of the orders to the example position tracker 912. In certain embodiments, the pre-trade risk module 910 may further include a copy of the internalization record generated at the trade internalization module 902. The example pre-trade risk module 910 may identify potential internalization opportunities and route or otherwise communicate order to the trade internalization manager 902 and/or the exchange 914 based on the identified potential as discuss in connection with FIG. 5B.

In the illustrated example, the example position tracker 912 tracks the trade orders and current positions of all trading activity of the trading institution. For example, all open and completed trades are recorded and stored by the example position tracker 912. In this way, trading device(s) 902, high frequency trade server(s) 908, and pre-trade risk modules 910 may query at any moment, the various positions of groups, traders, and order book(s) associated with the trading institution.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A computer readable medium having stored therein instructions executable by a processor, including instructions executable to:
    receive a first message for a trade order, wherein the first message for the trade order was sent at substantially the same time as a second message for the trade order, wherein the second message for the trade order was sent to an exchange, wherein the first message for the trade order is received over a first communication path, wherein the second message for the trade order is sent to the exchange over a second communication path, wherein the first message for the trade order and the second message for the trade order are sent using multicast over the first communication path and the second communication path such that receiving the first message for the trade order does not introduce additional latency in the second message for the trade order being sent to the exchange;
    identify a contra-side trade order based on the first message for the trade order in an internalization book, wherein the contra-side trade order is for an opposite side from a side for the trade order;
    send a command to adjust a quantity of the trade order to the exchange based on a quantity of the contra-side trade order; and
    execute an internal trade of the trade order based on the contra-side trade order.

2. The computer readable medium of claim 1, wherein the trade order is sent by a trading device.

3. The computer readable medium of claim 1, wherein the first message for the trade order is received by a trade internalization manager.

4. The computer readable medium of claim 1, wherein the contra-side trade order is identified based on a price of the trade order.

5. The computer readable medium of claim 1, wherein the contra-side trade order is identified based on a quantity of the trade order.

6. The computer readable medium of claim 1, wherein the contra-side trade order is for a same trader as the trade order.

7. The computer readable medium of claim 1, wherein the contra-side trade order is for a same trading group as the trade order.

8. The computer readable medium of claim 1, wherein the contra-side trade order is for a same institution as the trade order.

9. The computer readable medium of claim 1, wherein the command to adjust the quantity of the trade order is a command to cancel the trade order.

10. The computer readable medium of claim 1, wherein the command to adjust the quantity of the trade order is a command to modify the trade order.

11. The computer readable medium of claim 1, further including instructions executable to:
    receive a confirmation of the command to adjust the quantity of the trade order from the exchange, wherein executing the internal trade is further based on the confirmation from the exchange.

12. The computer readable medium of claim 1, further including instructions executable to:
    request approval to execute the internal trade.

* * * * *